United States Patent
Yang et al.

(10) Patent No.: US 9,319,924 B2
(45) Date of Patent: Apr. 19, 2016

(54) METHOD AND SYSTEM FOR CONTROLLING EFFECTIVE TIME OF TERMINAL TRIGGER MESSAGE

(75) Inventors: Kun Yang, Shenzhen (CN); Hao Wu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 23 days.

(21) Appl. No.: 14/352,172

(22) PCT Filed: Jan. 16, 2012

(86) PCT No.: PCT/CN2012/070413
§ 371 (c)(1),
(2), (4) Date: Apr. 16, 2014

(87) PCT Pub. No.: WO2013/067773
PCT Pub. Date: May 16, 2013

(65) Prior Publication Data
US 2014/0254383 A1    Sep. 11, 2014

(30) Foreign Application Priority Data
Nov. 11, 2011    (CN) .......................... 2011 1 0356681

(51) Int. Cl.
*H04W 28/02* (2009.01)
*H04W 76/02* (2009.01)
*H04W 4/00* (2009.01)

(52) U.S. Cl.
CPC .......... *H04W 28/0215* (2013.01); *H04W 4/005* (2013.01); *H04W 76/027* (2013.01)

(58) Field of Classification Search
CPC ..... H04W 4/005; H04W 68/00; H04W 76/02; H04W 4/08; H04W 4/14
See application file for complete search history.

(56) References Cited

U.S. PATENT DOCUMENTS 8,818,426 B2 * 8/2014 Jain et al. ...................... 455/458
9,049,614 B2 * 6/2015 Ai
(Continued)

FOREIGN PATENT DOCUMENTS

CN    101541093 A    9/2009
CN    102026156 A    4/2011

OTHER PUBLICATIONS

International Search Report in international application No. PCT/CN2012/070413, mailed on Aug. 16, 2012. (4 pages—see entire document).

(Continued)

*Primary Examiner* — Jung Park
(74) *Attorney, Agent, or Firm* — Oppedahl Patent Law Firm LLC

(57) ABSTRACT

A method for controlling effective time of a terminal trigger message is disclosed. The method includes: a mobility management unit receives a terminal trigger message from a Machine Type Communication (MTC) application server; and in a scenario of congestion control, the mobility management unit determines that a time value of a back-off timer is longer than a time value of an effective timer related to the terminal trigger message, and reconfigures the time value for the effective timer related to the terminal trigger message. A system for controlling effective time of a terminal trigger message is further disclosed. With the present disclosure, before the back-off timer of a terminal expires, a network can reserve the trigger message to avoid an unsuccessful trigger of the terminal, thus improving a success rate of triggering the terminal.

16 Claims, 10 Drawing Sheets

(56) References Cited

U.S. PATENT DOCUMENTS

| | | | |
|---|---|---|---|
| 2006/0050645 A1 | 3/2006 | Chappell et al. | |
| 2011/0085497 A1* | 4/2011 | Fang | H04W 48/16 370/328 |
| 2011/0199905 A1* | 8/2011 | Pinheiro | H04W 4/005 370/235 |
| 2012/0257571 A1* | 10/2012 | Liao | H04W 4/005 370/328 |
| 2013/0005387 A1* | 1/2013 | Aso et al. | 455/517 |
| 2013/0012204 A1* | 1/2013 | Kim et al. | 455/435.1 |
| 2013/0136072 A1* | 5/2013 | Bachmann et al. | 370/329 |
| 2013/0279372 A1* | 10/2013 | Jain | H04W 4/06 370/254 |
| 2014/0219182 A1* | 8/2014 | Chandramouli et al. | 370/328 |
| 2014/0274082 A1* | 9/2014 | Huang | H04L 5/0037 455/450 |
| 2014/0293964 A1* | 10/2014 | Park et al. | 370/331 |

OTHER PUBLICATIONS

English Translation of the Written Opinion of the International Search Authority in international application No. PCT/CN20121070413, mailed on Aug. 16, 2012. (5 pages—see entire document).

HTC, "Load/Overload Control via MTC-IWF," 3GPP, SA WG2 Meeting #87, S2-114674, Sep. 14, 2011. (5 pages—see International Search Report in international application number: PCT/CN2012/070413 for relevant pages).

Supplementary European Search Report in European application No. 12847126.5, mailed on Oct. 9, 2015.

Consideration on SMS Based Trigger Solution, Oct. 14, 2011.

3GPP TR 23.888 v1.5.0, Oct. 19, 2011.

* cited by examiner

METHOD AND SYSTEM FOR CONTROLLING EFFECTIVE TIME OF TERMINAL TRIGGER MESSAGE

TECHNICAL FIELD

The present disclosure relates to the field of terminal communication, and in particular to a method and system for controlling effective time of a terminal trigger message.

BACKGROUND

FIG. 1 is a schematic diagram of a structure of a cellular wireless communication system. As shown in FIG. 1, the cellular wireless communication system is mainly composed of a Core Network (CN), a Radio Access Network (RAN) and a terminal.

The CN is responsible for a transaction for a Non-Access Stratum (NAS), such as terminal location update, and is an anchor for a user plane.

The RAN includes a base station, or a base station and a base station controller. The RAN is responsible for a transaction for an access stratum (such as management of radio resources). There may be a physical or logical connection between base stations according to a practical situation, and each base station may be connected to one or more other base stations and may be connected to one or more CN nodes;

A terminal, i.e., a User Equipment (UE), refers to any equipment which may communicate with a cellular wireless communication network, such as a mobile phone or a laptop.

A mobility management unit (a Mobility Management Entity (MME) or a Serving General Packet Radio Service (GPRS) Support Node (SGSN)) is a unit which is located in the CN and is responsible for managing access control, position information update and handover of the terminal. The MME or SGSN is responsible for NAS signalling control from the CN to the terminal and registering the terminal to a network.

A home subscriber information unit (a Home Subscriber Server (HSS) or a Home Location Register (HLR)) is an entity which is located in the CN and is responsible for storing identity information, authentication information, authorization information and other information of the terminal equipment. According to different situations, the HSS or HLR may be used to store the identity information of a user and binding information of the user and the terminal equipment, or only store the identity information of the user (the binding information of the user and the terminal equipment may be stored by a gateway), or directly store identity information of the terminal equipment. The HSS or HLR is also responsible for a subscription database of the user, and performing authentication and authorization on the user. A service platform may inquire user or terminal information from the HSS or HLR.

A Machine Type Communication Inter Working Function entity (MTC IWF) is a connection entity between a mobile communication network and an external public network, which can implement protocol conversion, address inquiring, information storing and other functions. The IWF entity is connected to an application server externally, and may be connected to the HSS/HLR or MME/SGSN internally.

Generally, for some services, such as a monitoring and management system needing to acquire monitoring data from a monitor terminal, a terminal needs to be triggered by an MTC application server to establish a connection of the terminal and the MTC application server, so as to report required data. Then, after receiving a trigger message from the MTC application server, the terminal needs to be able to immediately response to establish the connection of the terminal and the MTC application server. At present, in order to satisfy a requirement of the MTC application server for triggering the terminal, in existing solutions, a trigger message is sent to an HSS via a server, the HSS inquires the MME/SGSN of a service terminal and sends the trigger message to the MME/SGSN, then the MME/SGSN sends the trigger message to the terminal through an NAS signalling, and the terminal establishes a connection of the terminal and the server according to the trigger message.

In the existing solutions, the MME or SGSN may reject an NAS request message initiated by a terminal which is under congestion control, and include a back-off timer in a rejection message such that the terminal cannot initiate any request until the back-off timer expires. However, since the existing network may remove the corresponding terminal trigger message after an effective timer related to the terminal trigger message expires, before the back-off timer of the terminal expires and after the effective timer related to the terminal trigger message expires, the existing network may remove the corresponding terminal trigger message, such that the terminal fails to be triggered.

SUMMARY

In view of the above, the present disclosure is intended to provide a method and system for controlling effective time of a terminal trigger message, which is capable of improving the success rate of triggering the terminal.

To this end, technical solutions of the present disclosure are implemented as follows.

A method for controlling effective time of a terminal trigger message includes that:

a mobility management unit receives a terminal trigger message from a Machine Type Communication (MTC) application server;

in a scenario of congestion control, the mobility management unit determines that a time value of a back-off timer is longer than a time value of an effective timer related to the terminal trigger message, and reconfigures the time value for the effective timer related to the terminal trigger message.

After the mobility management unit reconfigures the time value of the effective timer related to the terminal trigger message, the method may further include that:

the mobility management unit informs a relevant network element to update the time value of the effective timer related to the terminal trigger message.

After the mobility management unit receives the terminal trigger message from the MTC server, the method may further include that: the mobility management unit stores the terminal trigger message.

The mobility management unit reconfiguring the time value for the effective timer related to the terminal trigger message may include that: reconfiguring the time value for the effective timer related to the terminal trigger message such that the reconfigured time value of the effective timer related to the trigger message is not less than the time value of the back-off timer.

The mobility management unit may be a Mobility Management Entity (MME) or a Serving General Packet Radio Service Support Node (SGSN).

The relevant network element may include one or more of the followings: a home subscriber information unit and an MTC Inter Working Function entity (MTC IWF).

The home subscriber information unit may be a Home Subscriber Server (HSS) or a Home Location Register (HLR).

A system for controlling effective time of a terminal trigger message includes: a receiving unit, a determining unit and a configuring unit, wherein the receiving unit is configured to receive a terminal trigger message from an MTC application server;

the determining unit is configured to, in a scenario of congestion control, determine whether a time value of a back-off timer is longer than a time value of an effective timer related to the terminal trigger message which is received by the receiving unit; and the configuring unit is configured to, when the determining unit determines that the time value of the back-off timer is longer than the time value of the effective timer related to the terminal trigger message, reconfigure the time value for the effective timer related to the terminal trigger message.

The system may further include an informing unit configured to, after the configuring unit reconfigures the time value for the effective timer related to the terminal trigger message, inform a relevant network element to update the time value of the effective timer related to the terminal trigger message.

The system may further include a storing unit configured to store the terminal trigger message after the receiving unit receives the terminal trigger message from the MTC application server.

the configuring unit may be configured to reconfigure the time value for the effective timer related to the terminal trigger message such that the reconfigured time value of the effective timer related to the trigger message is not less than the time value of the back-off timer.

The mobility management unit may be an MME or an SGSN.

The relevant network element may include one or more of the followings: a home subscriber information unit and an MTC IWF.

The home subscriber information unit may be an HSS or an HLR.

By means of the method and system for controlling effective time of a terminal trigger message according to the present disclosure, a mobility management unit receives a terminal trigger message from an MTC application server; in a scenario of congestion control, the mobility management unit determines that a time value of a back-off timer is longer than a time value of an effective timer related to the terminal trigger message, and reconfigures the time value for the effective timer related to the terminal trigger message. With the present disclosure, before the back-off timer of a terminal expires, a network can reserve the trigger message to avoid an unsuccessful trigger of the terminal, thus improving a success rate of triggering the terminal.

DETAILED DESCRIPTION

A mobility management unit receives a terminal trigger message from an MTC application server; and in a scenario of congestion control, the mobility management unit determines that a time value of a back-off timer is longer than a time value of an effective timer related to the terminal trigger message, and then reconfigures the time value for the effective timer related to the terminal trigger message.

Figure 1:
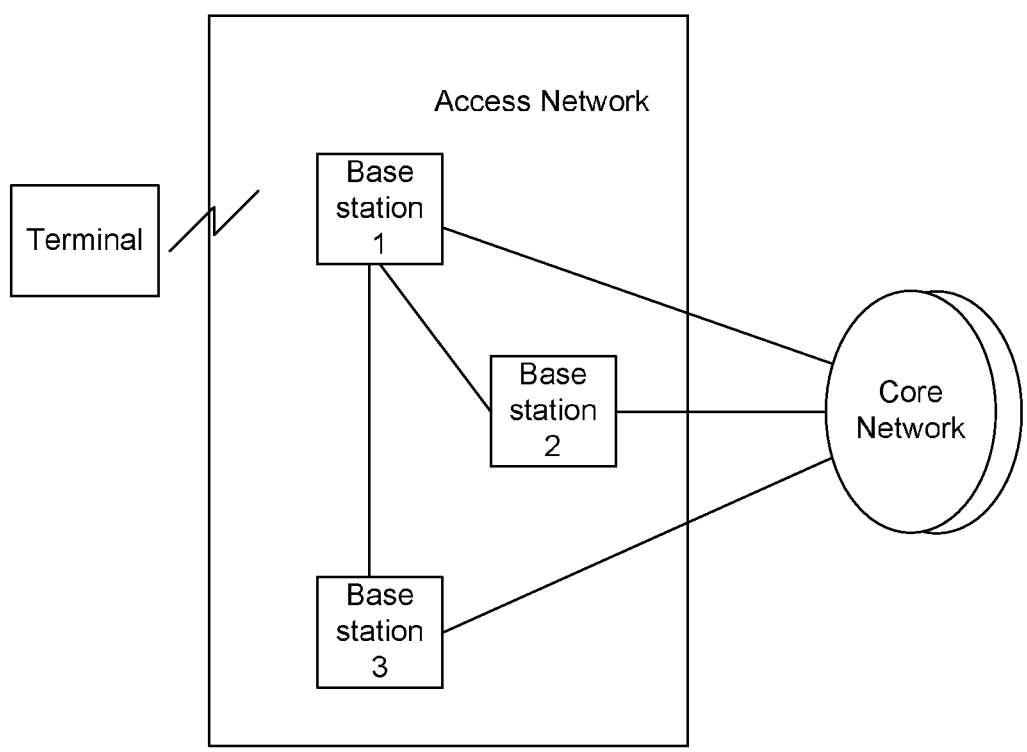
FIG. 1 is a schematic diagram of a structure of a cellular wireless communication system.
Figure 2:
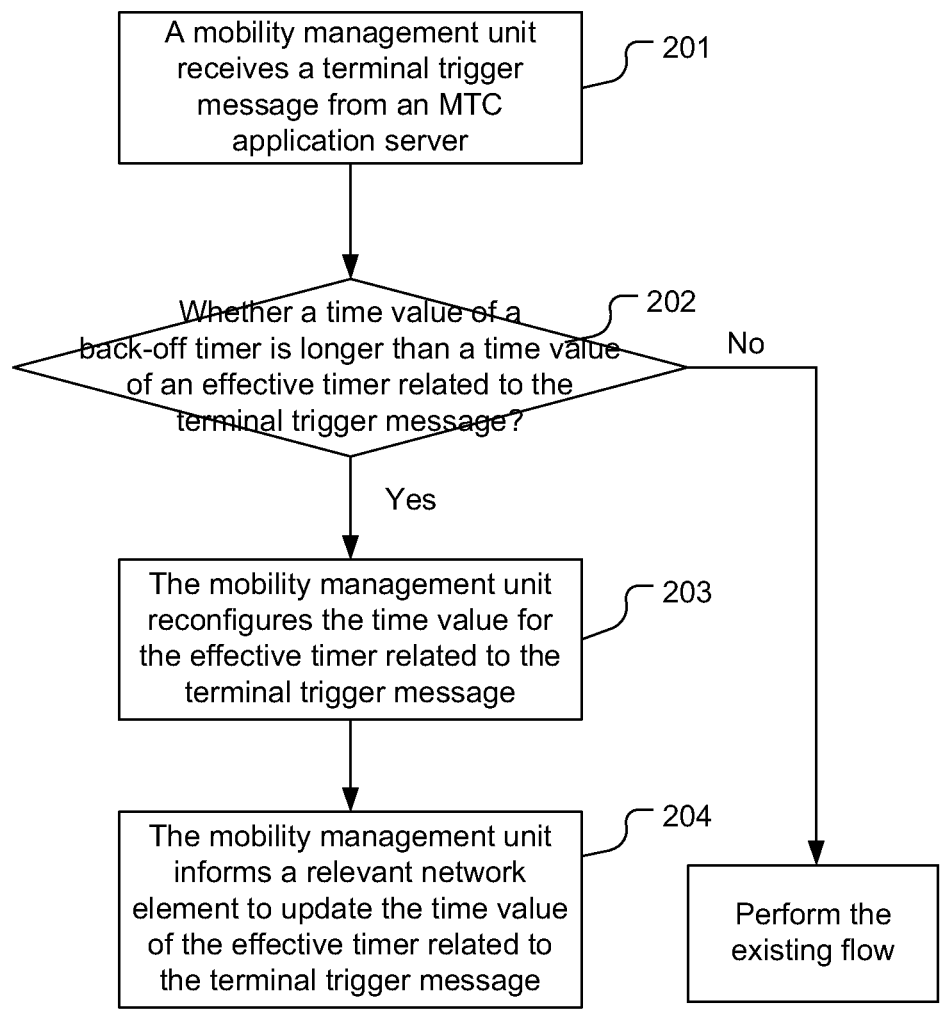
FIG. 2 is a flowchart of a method for controlling effective time of a terminal trigger message according to the present disclosure.

FIG. 2 is a flowchart of a method for controlling effective time of a terminal trigger message according to the present disclosure. As shown in FIG. 2, the method includes:

Step 201: A mobility management unit receives a terminal trigger message from an MTC application server.

Here, the mobility management unit may be an MME or an SGSN.

Generally, after the MTC application server sends the terminal trigger message to the mobility management unit, the mobility management unit may store the terminal trigger message.

Step 202: In a scenario of congestion control, the mobility management unit determines whether a time value of a back-off timer is longer than a time value of an effective timer related to the terminal trigger message. If the time value of the back-off timer is longer than the time value of the effective timer related to the terminal trigger message, then Step 203 is performed; otherwise, the existing flow is performed.

Step 203: The mobility management unit reconfigures the time value for the effective timer related to the terminal trigger message.

Here, when the time value of the back-off timer is longer than the time value of the effective timer related to the trigger message, the mobility management unit locally reconfigures a longer time value for the effective timer related to the terminal trigger message, the reconfigured time value of the effective timer related to the trigger message is not less than that of the back-off timer.

Step 204: The mobility management unit informs a relevant network element to update the time value of the effective timer related to the terminal trigger message.

Here, the relevant network element refers to a network element which stores the terminal trigger message, and the relevant network element may include but be not limited to one or more of the followings: a home subscriber information unit (an HSS or an HLR) and an MTC IWF.

The MME/SGSN may inform the HSS/HLR and/or the MTC IWF to update the time value of the effective timer related to the terminal trigger message.

Accordingly, the present disclosure further provides a system for controlling effective time of a terminal trigger message. The system includes: a receiving unit, a determining unit and a configuring unit, wherein the receiving unit is configured to receive a terminal trigger message from an MTC application server;

the determining unit is configured to, in a scenario of congestion control, determine whether a time value of a back-off timer is longer than a time value of an effective timer related to the terminal trigger message; and the configuring unit is configured to, when the determining unit determines that the time value of the back-off timer is longer than the time value of the effective timer related to the terminal trigger message, reconfigure the time value for the effective timer related to the terminal trigger message.

The system further includes an informing unit, which is configured to, after the configuring unit reconfigures the time value of the effective timer related to the terminal trigger message, inform a relevant network element to update the time value of the effective timer related to the terminal trigger message.

The system further includes a storing unit, which is configured to store the terminal trigger message after the receiving unit receives the terminal trigger message from the MTC application server.

The configuring unit is configured to reconfigure the time value for the effective timer related to the terminal trigger message such that the reconfigured time value of the effective timer related to the trigger message is not less than the time value of the back-off timer.

The mobility management unit is an MME or an SGSN.

The relevant network element includes one or more of the followings: a home subscriber information unit and an MTC IWF.

The home subscriber information unit is an HSS or an HLR.

The technical solution of the present disclosure is further elaborated below with reference to specific embodiments.

Embodiment 1

Figure 3:
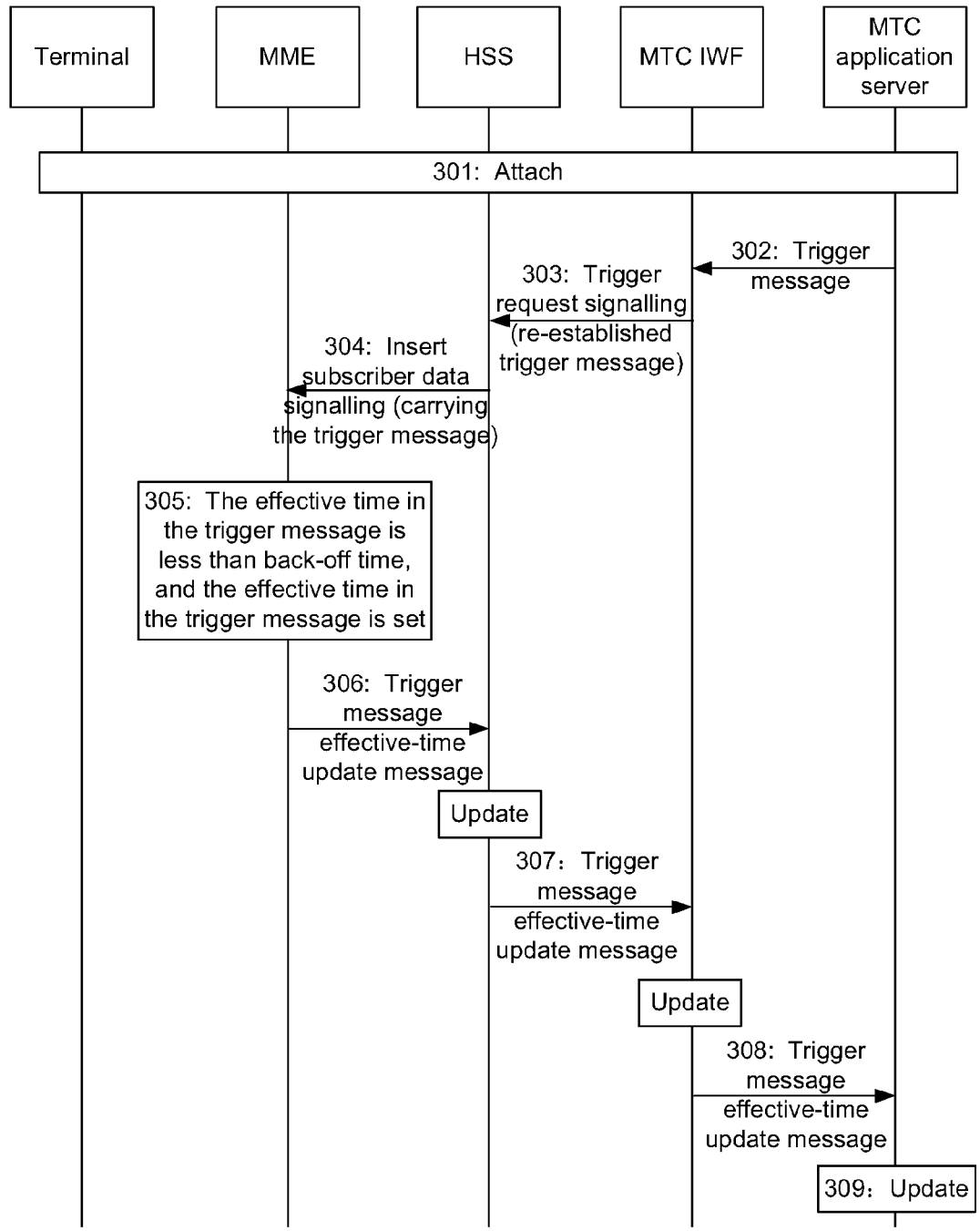
FIG. 3 is a flowchart of a method for controlling effective time of a terminal trigger message according to Embodiment 1 of the present disclosure.

In the embodiment, the MTC IWF and the HSS may store a terminal trigger message. FIG. 3 is a flowchart of a method for controlling effective time of the terminal trigger message according to Embodiment 1 of the present disclosure. As shown in FIG. 3, the flow includes:

Step 301: After the terminal is powered on and attaches to the network, when a signalling connection between the terminal and the current serving MME for the terminal has been released or interrupted, the terminal enters an idle state from a connection state, and the network turns on a mobile reachable timer.

Step 302: When the MTC application server needs to acquire real-time data from the terminal, the MTC application server sends a trigger message to the MTC IWF. The trigger message includes an identifier of the terminal, an identifier of an application, an address of the server, effective time of a trigger indication and the like (here, the identifier of the terminal is an external identifier used outside the network).

Step 303: A local database of the MTC IWF stores a one-to-one mapping table between an external identifier and an internal identifier and a more-to-one mapping table between the internal identifier and the HSS. The MTC IWF stores and resolves the trigger message, reads the terminal identifier included in the trigger message, looks up, according to the mapping table between the external identifier and the internal identifier stored in the local database, an internal identifier used in the network and corresponding to the terminal identifier included in the trigger message, and looks up, from the mapping table between the internal identifier and the HSS stored in the database, the HSS where the terminal is located according to the internal identifier. After the HSS where the terminal is located is found out, a new trigger message is established, in which the external identifier of the terminal included in the original trigger message is replaced by the internal identifier of the terminal, and the new trigger message is sent to the HSS via trigger request signalling.

Step 304: When the terminal is registered to the network, the HSS may store the current serving MME for the terminal. After receiving and storing the trigger message, the HSS looks up the serving MME for the terminal from the locally stored information according to the terminal identifier included in the trigger message, and sends the trigger message to the MME via insert subscriber data signalling.

Step 305: After receiving the insert subscriber data signalling from the HSS, the MME reads the trigger message included therein, sets a trigger timer T1 locally, and compares the effective time value in the trigger message with the current time value of the back-off timer. If the effective time value is less than the current time value of the back-off timer, then the MME sets the value of the timer T1 locally according to the current time value of the back-off timer, starts up the timer, and meanwhile stores the terminal trigger message.

Specifically, the time value of the timer T1 may be set to be slightly longer than the current time value of the back-off timer, for example, 4 minutes longer than the current time value of the back-off timer.

Step 306: Since the terminal is under congestion control, the MME may not send the trigger message immediately, but waits and sends the trigger message until the terminal has established an NAS connection with the MME when the back-off timer expires.

The MME sends a trigger message effective-time update message to the HSS via Stream Control Transmission Protocol (SCTP) signalling on a reference point S6a (a reference point between the MME and the HSS) to inform the HSS to update the effective time of the terminal trigger message, wherein the trigger message effective-time update message includes the time value of the timer T1 set by the MME.

Step 307: After receiving the SCTP signalling from the MME, the HSS reads the trigger message effective-time update message included in the SCTP signalling, and updates the effective time of the terminal trigger message with the time value of the timer T1 set by the MME. Meanwhile, the HSS sends the trigger message effective-time update message to the MTC IWF to inform the MTC IWF to update the effective time of the terminal trigger message.

Step 308: After receiving the trigger message effective-time update message from the HSS, the MTC IWF updates the effective time of the terminal trigger message with the time value of the timer T1 set by the MME. Meanwhile, the MTC IWF sends the trigger message effective-time update message to the MTC application server to inform the MTC application server to update the effective time of the terminal trigger message.

Step 309: After receiving the trigger message effective-time update message from the MTC IWF, the MTC application server updates the effective time of the terminal trigger message with the time value of the timer T1 set by the MME.

Embodiment 2

Figure 4:
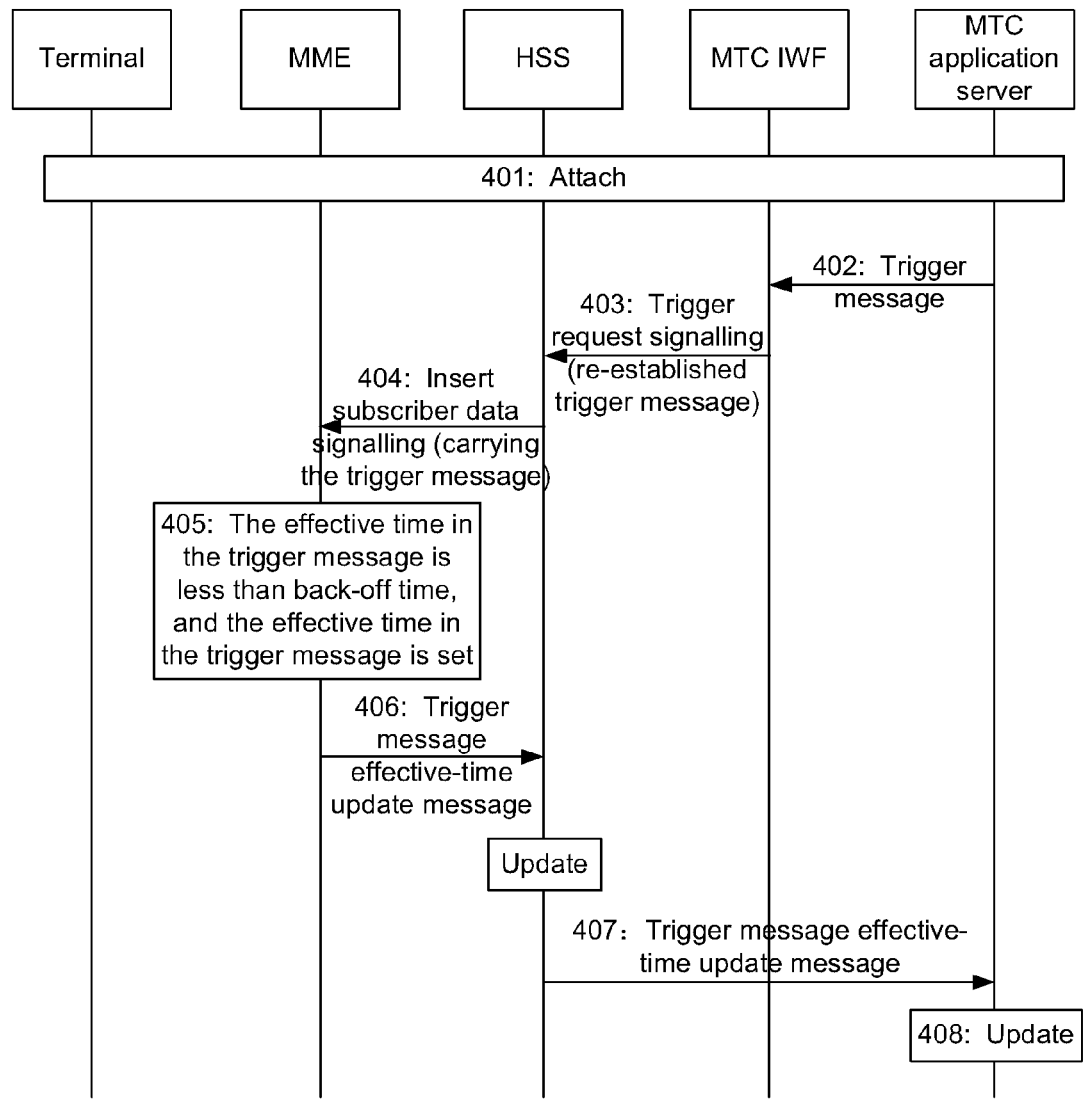
FIG. 4 is a flowchart of a method for controlling effective time of a terminal trigger message according to Embodiment 2 of the present disclosure.

In the embodiment, the HSS may store a terminal trigger message. FIG. 4 is a flowchart of a method for controlling effective time of the terminal trigger message according to Embodiment 2 of the present disclosure. As shown in FIG. 4, the flow includes:

Step 401: After the terminal is powered on and attaches to the network, when a signalling connection between the terminal and the current serving MME for the terminal has been released or interrupted, the terminal enters an idle state from a connection state, and the network turns on a mobile reachable timer.

Step 402: When the MTC application server needs to acquire real-time data from the terminal, the MTC application server sends a trigger message to the MTC IWF. The trigger message includes an identifier of the terminal, an identifier of an application, an address of the server, effective time of a trigger indication and the like (here, the identifier of the terminal is an external identifier used outside the network).

Step 403: A local database of the MTC IWF stores a one-to-one mapping table between an external identifier and an internal identifier and a more-to-one mapping table between the internal identifier and the HSS. The MTC IWF resolves the trigger message, reads the terminal identifier included in the trigger message, looks up, from the mapping table between the external identifier and the internal identifier stored in the local database, an internal identifier used in the network and corresponding to the terminal identifier included in the trigger message, and looks up, from the mapping table between the internal identifier and the HSS stored in the database, the HSS where the terminal is located according to the internal identifier. After the HSS where the terminal is located is found out, a new trigger message is established, in which the external identifier of the terminal in the original trigger message is replaced by the internal identifier of the terminal, and the new trigger message is sent to the HSS via trigger request signalling.

Step 404: When the terminal is registered to the network, the HSS may store the current serving MME for the terminal. After receiving and storing the trigger message, the HSS looks up the serving MME for the terminal from the locally stored information according to the terminal identifier included in the trigger message, and sends the trigger message to the MME via insert subscriber data signalling.

Step 405: After receiving the insert subscriber data signalling from the HSS, the MME reads the trigger message included in the insert subscriber data signalling, sets a trigger timer T1 locally, and compares the effective time value in the trigger message with the current time value of the back-off timer. If the effective time value is less than the current time value of the back-off timer, then the MME sets the value of the timer T1 locally according to the current time value of the back-off timer, starts up the timer, and meanwhile stores the terminal trigger message.

Specifically, the time value of the timer T1 may be set to be slightly longer than the current time value of the back-off timer, for example, 4 minutes longer than the current time value of the back-off timer.

Step 406: Since the terminal is under congestion control, the MME may not send the trigger message immediately, but waits and sends the trigger message until the terminal has established an NAS connection with the MME when the back-off timer expires.

The MME sends a trigger message effective-time update message to the HSS via Stream Control Transmission Protocol (SCTP) signalling on a reference point S6a (a reference point between the MME and the HSS) to inform the HSS to update the effective time of the terminal trigger message, wherein the trigger message effective-time update message includes the time value of the timer T1 set by the MME.

Step 407: After receiving the SCTP signalling from the MME, the HSS reads the trigger message effective-time update message included in the SCTP signalling, and updates the effective time of the terminal trigger message with the time value of the timer T1 set by the MME. Meanwhile, the HSS sends the trigger message effective-time update message to the MTC application server to inform the MTC application server to update the effective time of the terminal trigger message.

It is should be noted that the HSS may send the trigger message effective-time update message to the MTC application server via the MTC IWF. However, here, the MTC IWF does not update the effective time of the terminal trigger message according to the trigger message effective-time update message, but only sends the trigger message effective-time update message.

Step 408: After receiving the trigger message effective-time update message from the HSS, the MTC application server updates the effective time of the terminal trigger message with the time value of the timer T1 set by the MME.

Embodiment 3

Figure 5:
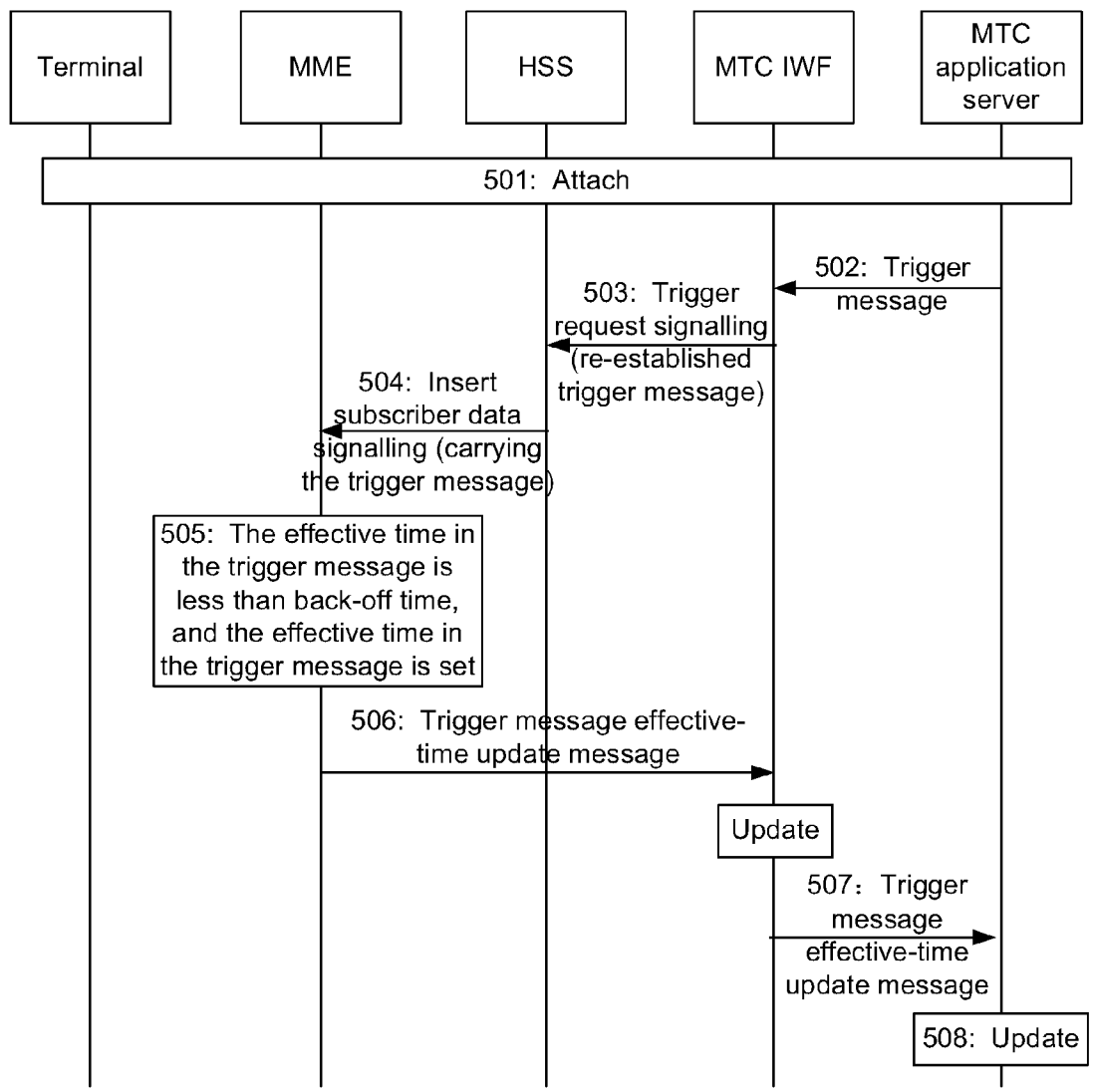
FIG. 5 is a flowchart of a method for controlling effective time of a terminal trigger message according to Embodiment 3 of the present disclosure.

In the embodiment, the MTC IWF may store a terminal trigger message. FIG. 5 is a flowchart of a method for controlling effective time of a terminal trigger message according to Embodiment 3 of the present disclosure. As shown in FIG. 5, the flow includes:

Step 501: After the terminal is powered on and attaches to the network, when a signalling connection between the terminal and the current serving MME for the terminal has been released or interrupted, the terminal enters an idle state from a connection state, and the network turns on a mobile reachable timer.

Step 502: When needing to acquire real-time data from the terminal, the MTC application server sends a trigger message to the MTC IWF. The trigger message includes an identifier of the terminal, an identifier of an application, an address of the server, effective time of a trigger indication and the like (here, the identifier of the terminal is an external identifier used outside the network).

Step 503: A local database of the MTC IWF stores a one-to-one mapping table between an external identifier and an internal identifier and a more-to-one mapping table between the internal identifier and the HSS. The MTC IWF stores and resolves the trigger message, reads the terminal identifier included in the trigger message, looks up, according to the mapping table between the external identifier and the internal identifier stored in the local database, an internal identifier used in the network and corresponding to the terminal identifier included in the trigger message, and looks up, from the mapping table between the internal identifier and the HSS stored in the database, the HSS where the terminal is located according to the internal identifier. After the HSS where the terminal is located is found out, a new trigger message is established, in which the external identifier of the terminal included in the original trigger message is replaced by the internal identifier of the terminal, and the new trigger message is sent to the HSS via trigger request signalling.

Step 504: When the terminal is registered to the network, the HSS may store the current serving MME for the terminal. After receiving the trigger message, the HSS looks up the serving MME for the terminal from the locally stored information according to the terminal identifier included in the trigger message, and sends the trigger message to the MME via insert subscriber data signalling.

Step 505: After receiving the insert subscriber data signalling from the HSS, the MME reads the trigger message included in the insert subscriber data signalling, sets a trigger timer T1 locally, and compares the effective time value in the trigger message with the current time value of the back-off timer. If the effective time value is less than the current time value of the back-off timer, then the MME sets the value of the timer T1 locally according to the current time value of the back-off timer, starts up the timer, and meanwhile stores the terminal trigger message.

Specifically, the time value of the timer T1 may be set to be slightly longer than the current time value of the back-off timer, for example, 4 minutes longer than the current time value of the back-off timer.

Step 506: Since the terminal is under congestion control, the MME may not send the trigger message immediately, but waits and sends the trigger message until the terminal has established an NAS connection with the MME when the back-off timer expires.

The MME sends a trigger message effective-time update message to the MTC IWF to inform the MTC IWF to update the effective time of the terminal trigger message, wherein the trigger message effective-time update message includes the time value of the timer T1 set by the MME.

Step 507: After receiving the trigger message effective-time update message from the MME, the MTC IWF updates the effective time of the terminal trigger message with the time value of the timer T1 set by the MME. Meanwhile, the MTC IWF sends the trigger message effective-time update message to the MTC application server to inform the MTC application server to update the effective time of the terminal trigger message.

Step 508: After receiving the trigger message effective-time update message from the MTC IWF, the MTC application server updates the effective time of the terminal trigger message with the time value of the timer T1 set by the MME.

Embodiment 4

Figure 6:
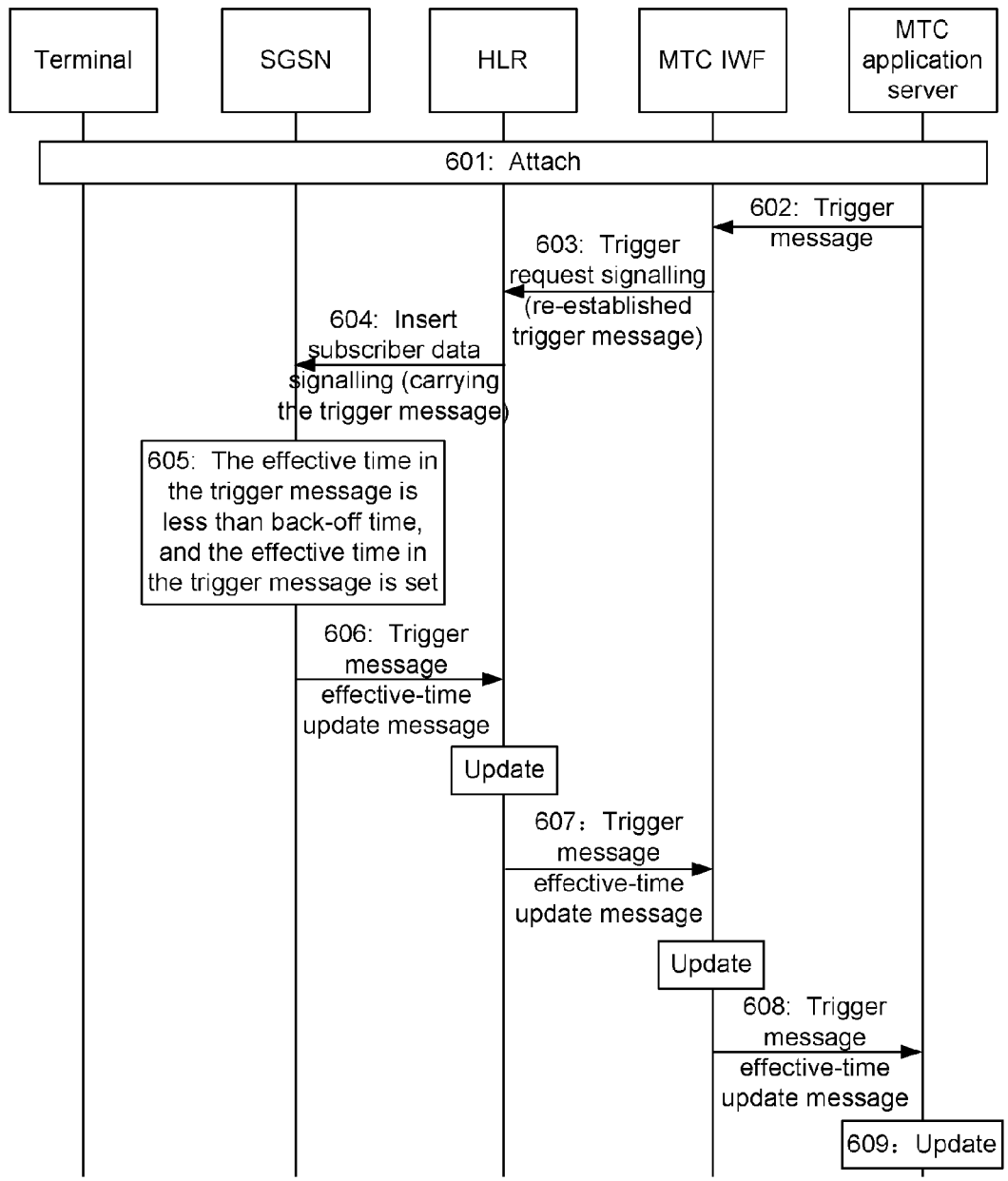
FIG. 6 is a flowchart of a method for controlling effective time of a terminal trigger message according to Embodiment 4 of the present disclosure.

In the embodiment, the MTC IWF and the HLR may store a terminal trigger message. FIG. 6 is a flowchart of a method for controlling effective time of a terminal trigger message according to Embodiment 4 of the present disclosure. As shown in FIG. 6, the flow includes:

Step 601: After the terminal is powered on and attaches to the network, when a signalling connection between the terminal and the current service SGSN of the terminal has been released or interrupted, the terminal enters an idle state from a connection state, and the network turns on a mobile reachable timer.

Step 602: When needing to acquire real-time data from the terminal, the MTC application server sends a trigger message to the MTC IWF. The trigger message includes an identifier of the terminal, an identifier of an application, an address of the server, effective time of a trigger indication and the like (here, the identifier of the terminal is an external identifier used outside the network).

Step 603: A local database of the MTC IWF stores a one-to-one mapping table between an external identifier and an internal identifier and a more-to-one mapping table between the internal identifier and the HLR. The MTC IWF stores and resolves the trigger message, reads the terminal identifier included in the trigger message, looks up, from the mapping table between the external identifier and the internal identifier stored in the local database, an internal identifier used in the network and corresponding to the terminal identifier included in the trigger message, and looks up, from the mapping table between the internal identifier and the HLR stored in the database, the HLR where the terminal is located according to the internal identifier. After the HLR where the terminal is located is found out, a new trigger message is established, in which the external identifier of the terminal included in the original trigger message is replaced by the internal identifier of the terminal, and the new trigger message is sent to the HLR via trigger request signalling.

Step 604: When the terminal is registered to the network, the HLR may store the current service SGSN of the terminal. After receiving and storing the trigger message, the HLR looks up the service SGSN of the terminal from the locally stored information according to the terminal identifier included in the trigger message, and sends the trigger message to the SGSN via insert subscriber data signalling.

Step 605: After receiving the insert subscriber data signalling from the HLR, the SGSN reads the trigger message included in the insert subscriber data signalling, sets a trigger timer T2 locally, and compares the effective time value in the trigger message with the current time value of the back-off timer. If the effective time value is less than the current time value of the back-off timer, then the SGSN sets the value of the timer T2 locally according to the current time value of the back-off timer, starts up the timer, and meanwhile stores the terminal trigger message.

Specifically, the time value of the timer T2 may be set to be slightly longer than the current time value of the back-off timer, for example, 4 minutes longer than the current time value of the back-off timer.

Step 606: Since the terminal is under congestion control, the SGSN may not send the trigger message immediately, but waits and sends the trigger message until the terminal has established an NAS connection with the SGSN when the back-off timer expires.

The SGSN sends a trigger message effective-time update message to the HLR via Mobile Application Protocol (MAP) signalling on a reference point Gr (a reference point between the SGSN and the HLR) to inform the HLR to update the effective time of the terminal trigger message, wherein the trigger message effective-time update message includes the time value of the timer T2 set by the SGSN.

Step 607: After receiving the SCTP signalling from the SGSN, the HLR reads the trigger message effective-time update message included in the SCTP signalling, and updates the effective time of the terminal trigger message with the time value of the timer T2 set by the SGSN. Meanwhile, the HLR sends the trigger message effective-time update message to the MTC IWF to inform the MTC IWF to update the effective time of the terminal trigger message.

Step 608: After receiving the trigger message effective-time update message from the HLR, the MTC IWF updates the effective time of the terminal trigger message with the time value of the timer T2 set by the SGSN. Meanwhile, the MTC IWF sends the trigger message effective-time update message to the MTC application server to inform the MTC application server to update the effective time of the terminal trigger message.

Step 609: After receiving the trigger message effective-time update message from the MTC IWF, the MTC application server updates the effective time of the terminal trigger message with the time value of the timer T2 set by the SGSN.

Embodiment 5

Figure 7:
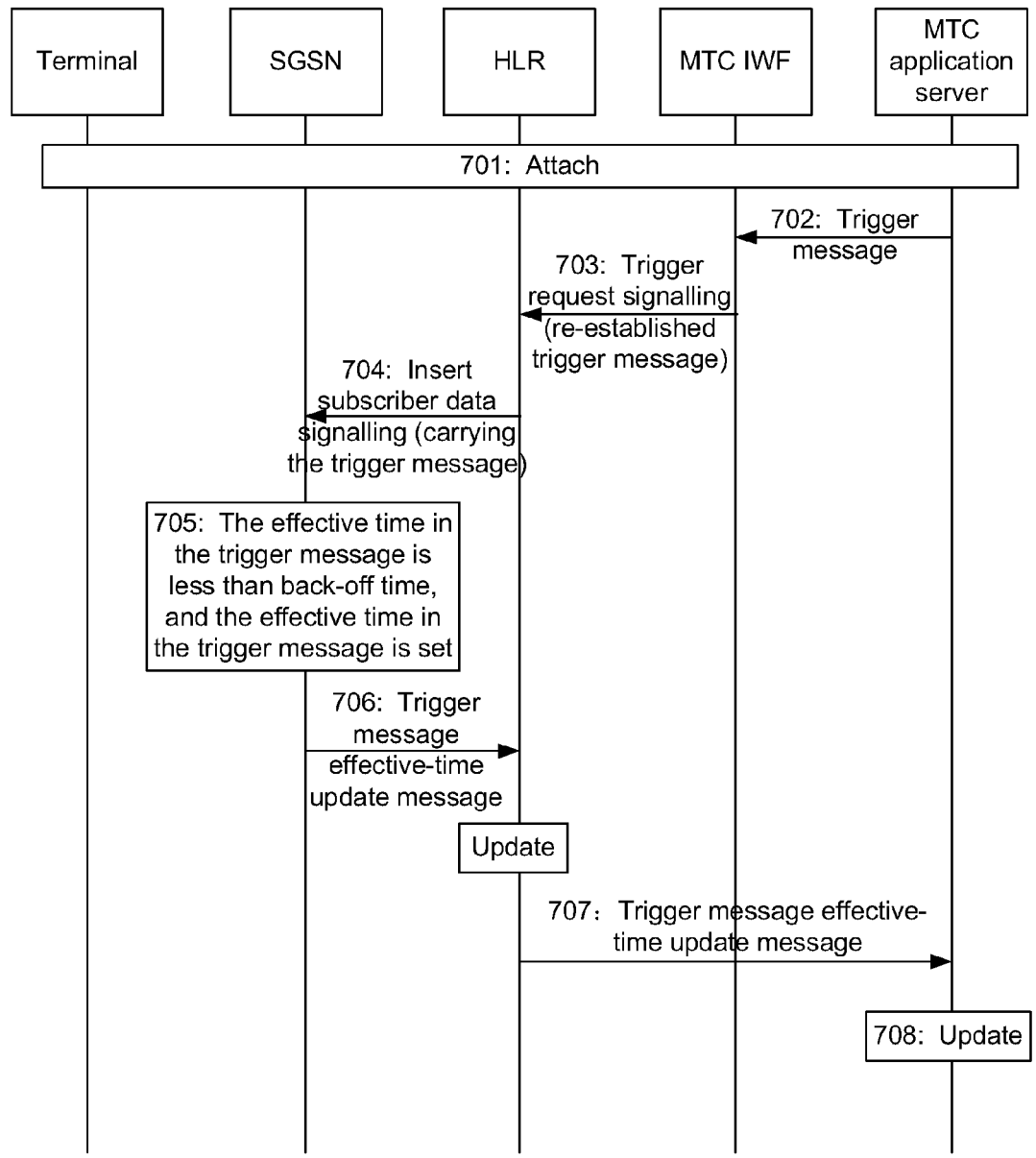
FIG. 7 is a flowchart of a method for controlling effective time of a terminal trigger message according to Embodiment 5 of the present disclosure.

In the embodiment, the HLR may store a terminal trigger message. FIG. 7 is a flowchart of a method for controlling effective time of the terminal trigger message according to Embodiment 5 of the present disclosure. As shown in FIG. 7, the flow includes:

Step 701: After the terminal is powered on and attaches to the network, when a signalling connection between the terminal and the current service SGSN of the terminal has been released or interrupted, the terminal enters an idle state from a connection state, and the network turns on a mobile reachable timer.

Step 702: When needing to acquire real-time data from the terminal, the MTC application server sends a trigger message to the MTC IWF. The trigger message includes an identifier of the terminal, an identifier of an application, an address of the server, effective time of a trigger indication and the like (here, the identifier of the terminal is an external identifier used outside the network).

Step 703: A local database of the MTC IWF stores a one-to-one mapping table between an external identifier and an internal identifier and a more-to-one mapping table between the internal identifier and the HLR. The MTC IWF resolves the trigger message, reads the terminal identifier included in the trigger message, looks up, from the mapping table between the external identifier and the internal identifier stored in the local database, an internal identifier used in the network and corresponding to the terminal identifier included in the trigger message, and looks up, from the mapping table between the internal identifier and the HLR stored in the database, the HLR where the terminal is located according to the internal identifier. After the HLR where the terminal is located is found out, a new trigger message is established, in which the external identifier of the terminal included in the original trigger message is replaced by the internal identifier of the terminal, and the new trigger message is sent to the HLR via trigger request signalling.

Step 704: When the terminal is registered to the network, the HLR may store the current service SGSN of the terminal. After receiving and storing the trigger message, the HLR looks up the service SGSN of the terminal from the locally stored information according to the terminal identifier included in the trigger message, and sends the trigger message to the SGSN via insert subscriber data signalling.

Step 705: After receiving the insert subscriber data signalling from the HLR, the SGSN reads the trigger message included in the insert subscriber data signalling, sets a trigger timer T2 locally, and compares the effective time value in the trigger message with the current time value of the back-off timer. If the effective time value is less than the current time value of the back-off timer, then the SGSN sets the value of the timer T2 locally according to the current time value of the back-off timer, starts up the timer, and meanwhile stores the terminal trigger message.

Specifically, the time value of the timer T2 may be set to be slightly longer than the current time value of the back-off timer, for example, 4 minutes longer than the current time value of the back-off timer.

Step 706: Since the terminal is under congestion control, the SGSN may not send the trigger message immediately, but waits and sends the trigger message until the terminal has established an NAS connection with the SGSN when the back-off timer expires.

The SGSN sends a trigger message effective-time update message to the HLR via Mobile Application Protocol (MAP) signalling on a reference point Gr (a reference point between the SGSN and the HLR) to inform the HLR to update the effective time of the terminal trigger message, wherein the trigger message effective-time update message includes the time value of the timer T2 set by the SGSN.

Step 707: After receiving the SCTP signalling from the SGSN, the HLR reads the trigger message effective-time update message included in the SCTP signalling, and updates the effective time of the terminal trigger message with the time value of the timer T2 set by the SGSN. Meanwhile, the HLR sends the trigger message effective-time update message to the MTC application server to inform the MTC application server to update the effective time of the terminal trigger message.

It is should be noted that the HLR may send the trigger message effective-time update message to the MTC application server via the MTC IWF. However, here, the MTC IWF does not update the effective time of the terminal trigger message according to the trigger message effective-time update message, but only sends the trigger message effective-time update message.

Step 708: After receiving the trigger message effective-time update message from the HLR, the MTC application server updates the effective time of the terminal trigger message with the time value of the timer T2 set by the SGSN.

Embodiment 6

Figure 8:
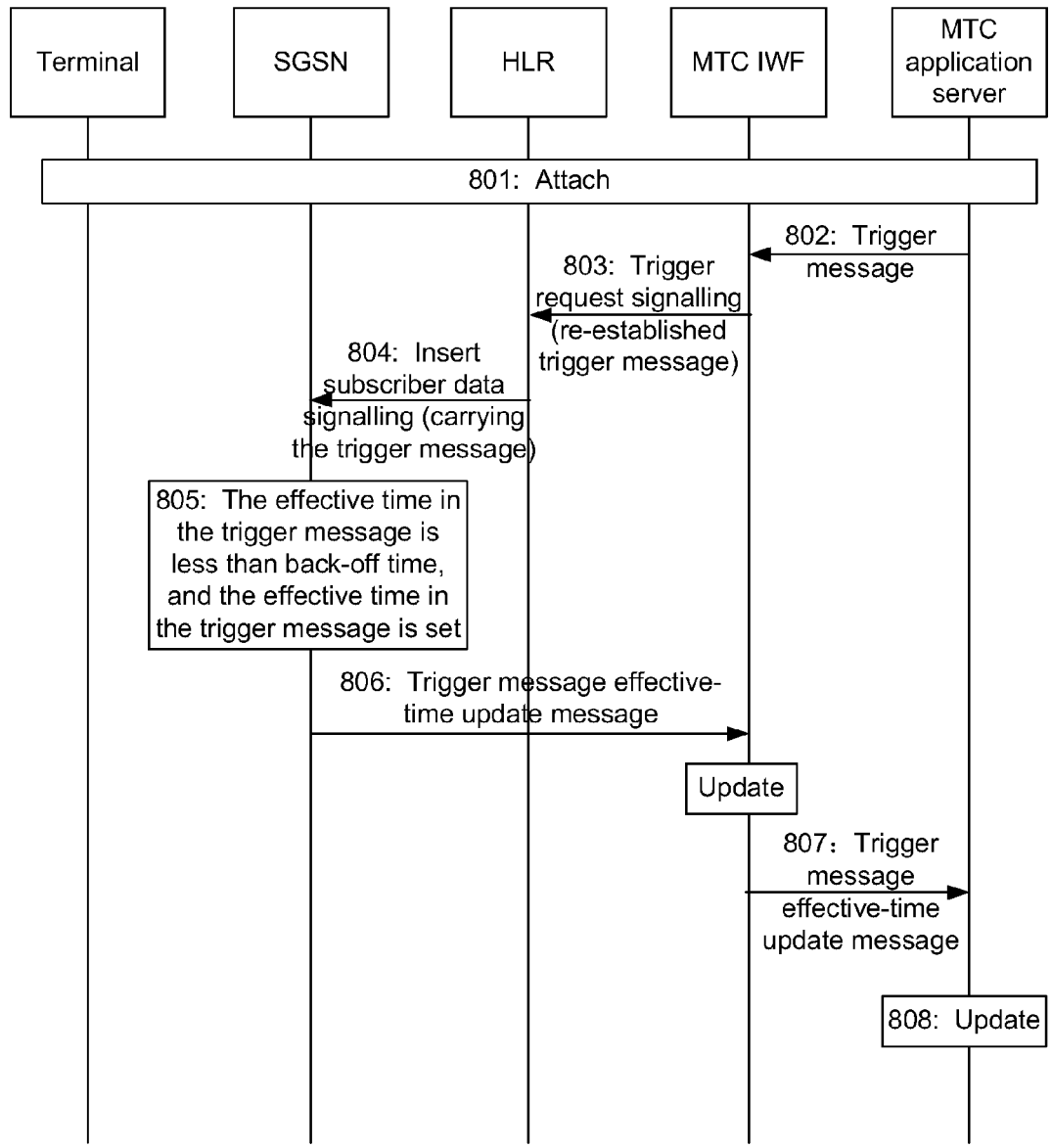
FIG. 8 is a flowchart of a method for controlling effective time of a terminal trigger message according to Embodiment 6 of the present disclosure.

In the embodiment, the MTC IWF may store a terminal trigger message. FIG. 8 is a flowchart of a method for controlling effective time of a terminal trigger message according to Embodiment 6 of the present disclosure. As shown in FIG. 8, the flow includes:

Step 801: After the terminal is powered on and attaches to the network, when a signalling connection between the terminal and the current service SGSN of the terminal has been released or interrupted, the terminal enters an idle state from a connection state, and the network turns on a mobile reachable timer.

Step 802: When needing to acquire real-time data from the terminal, the MTC application server sends a trigger message to the MTC IWF. The trigger message includes an identifier of the terminal, an identifier of an application, an address of the server, effective time of a trigger indication and the like (here, the identifier of the terminal is an external identifier used outside the network).

Step 803: A local database of the MTC IWF stores a one-to-one mapping table between an external identifier and an internal identifier and a more-to-one mapping table between the internal identifier and the HLR. The MTC IWF stores and resolves the trigger message, reads the terminal identifier included in the trigger message, looks up, from the mapping table between the external identifier and the internal identifier stored in the local database, an internal identifier used in the network and corresponding to the terminal identifier included in the trigger message, and looks up, from the mapping table between the internal identifier and the HLR stored in the database, the HLR where the terminal is located according to the internal identifier. After the HLR where the terminal is located is found out, a new trigger message is established, in which the external identifier of the terminal included in the original trigger message is replaced by the internal identifier of the terminal, and the new trigger message is sent to the HLR via trigger request signalling.

Step 804: When the terminal is registered to the network, the HLR may store the current service SGSN of the terminal. After receiving the trigger message, the HLR looks up the service SGSN of the terminal from the locally stored information according to the terminal identifier included in the trigger message, and sends the trigger message to the SGSN via insert subscriber data signalling.

Step 805: After receiving the insert subscriber data signalling from the HLR, the SGSN reads the trigger message included in the insert subscriber data signalling, sets a trigger timer T2 locally, and compares the effective time value in the trigger message with the current time value of the back-off timer. If the effective time value is less than the current time value of the back-off timer, then the SGSN sets the value of the timer T2 locally according to the current time value of the back-off timer, starts up the timer, and meanwhile stores the terminal trigger message.

Specifically, the time value of the timer T2 may be set to be slightly longer than the current time value of the back-off timer, for example, 4 minutes longer than the current time value of the back-off timer.

Step 806: Since the terminal is under congestion control, the SGSN may not send the trigger message immediately, but waits and sends the trigger message until the terminal has established an NAS connection with the SGSN when the back-off timer expires.

The SGSN sends a trigger message effective-time update message to the MTC IWF to inform the MTC IWF to update the effective time of the terminal trigger message, wherein the trigger message effective-time update message includes the time value of the timer T2 set by the SGSN.

Step 807: After receiving the trigger message effective-time update message from the SGSN, the MTC IWF updates the effective time of the terminal trigger message with the time value of the timer T2 set by the SGSN. Meanwhile, the MTC IWF sends the trigger message effective-time update message to the MTC application server to inform the MTC application server to update the effective time of the terminal trigger message.

Step 808: After receiving the trigger message effective-time update message from the MTC IWF, the MTC application server updates the effective time of the terminal trigger message with the time value of the timer T2 set by the SGSN.

Embodiment 7

Figure 9:
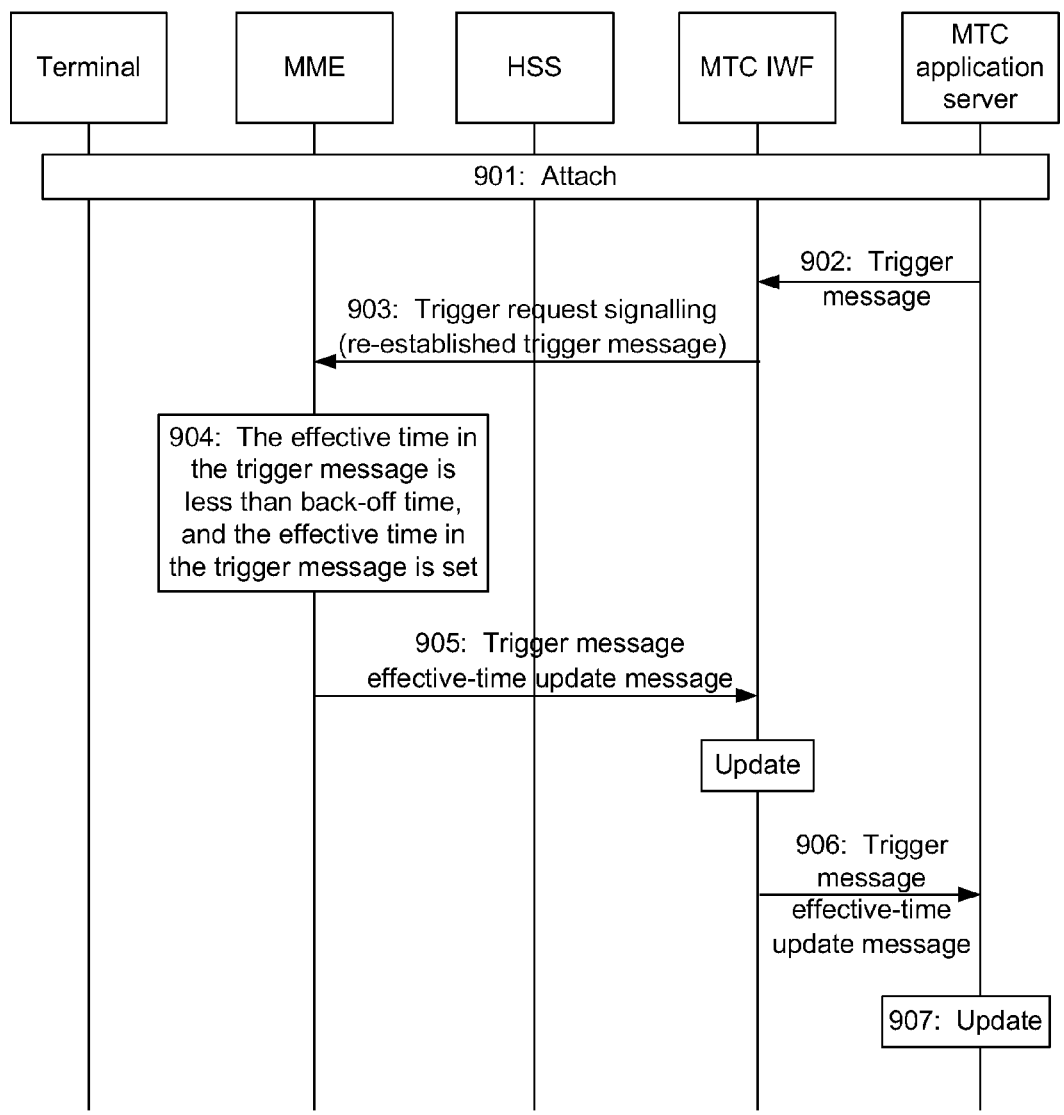
FIG. 9 is a flowchart of a method for controlling effective time of a terminal trigger message according to Embodiment 7 of the present disclosure.

In the embodiment, the MTC IWF may store a terminal trigger message. FIG. 9 is a flowchart of a method for controlling effective time of a terminal trigger message according to Embodiment 7 of the present disclosure. As shown in FIG. 9, the flow includes:

Step 901: After the terminal is powered on and attaches to the network, when a signalling connection between the terminal and the current serving MME for the terminal has been released or interrupted, the terminal enters an idle state from a connection state, and the network turns on a mobile reachable timer.

Step 902: When needing to acquire real-time data from the terminal, the MTC application server sends a trigger message to the MTC IWF. The trigger message includes an identifier of the terminal, an identifier of an application, an address of the server, effective time of a trigger indication and the like (here, the identifier of the terminal is an external identifier used outside the network).

Step 903: A local database of the MTC IWF stores a one-to-one mapping table between an external identifier and an internal identifier and a more-to-one mapping table between the internal identifier and the MME. The MTC IWF stores and resolves the trigger message, reads the terminal identifier included in the trigger message, looks up, from the mapping table between the external identifier and the internal identifier stored in the local database, an internal identifier used in the network and corresponding to the terminal identifier included in the trigger message, and looks up, from the mapping table between the internal identifier and the MME stored in the database, the MME where the terminal is located according to the internal identifier. After the MME where the terminal is located is found out, a new trigger message is established, in which the external identifier of the terminal included in the original trigger message is replaced by the internal identifier of the terminal, and the new trigger message is sent to the MME via trigger request signalling.

Step 904: After receiving the insert subscriber data signalling from the MTC IWF, the MME reads the trigger message included in the insert subscriber data signalling, sets a trigger timer T1 locally, and compares the effective time value in the trigger message with the current time value of the back-off timer. If the effective time value is less than the current time value of the back-off timer, then the MME sets the value of the timer T1 locally according to the current time value of the back-off timer, starts up the timer, and meanwhile stores the terminal trigger message.

Specifically, the time value of the timer T1 may be set to be slightly longer than the current time value of the back-off timer, for example, 4 minutes longer than the current time value of the back-off timer.

Step 905: Since the terminal is under congestion control, the MME may not send the trigger message immediately, but waits and sends the trigger message until the terminal has established an NAS connection with the MME when the back-off timer expires.

The MME sends a trigger message effective-time update message to the MTC IWF to inform the MTC IWF to update the effective time of the terminal trigger message, wherein the trigger message effective-time update message includes the time value of the timer T1 set by the MME.

Step 906: After receiving the trigger message effective-time update message from the MME, the MTC IWF updates the effective time of the terminal trigger message with the time value of the timer T1 set by the MME. Meanwhile, the MTC IWF sends the trigger message effective-time update message to the MTC application server to inform the MTC application server to update the effective time of the terminal trigger message.

Step 907: After receiving the trigger message effective-time update message from the MTC IWF, the MTC application server updates the effective time of the terminal trigger message with the time value of the timer T1 set by the MME.

Embodiment 8

Figure 10:
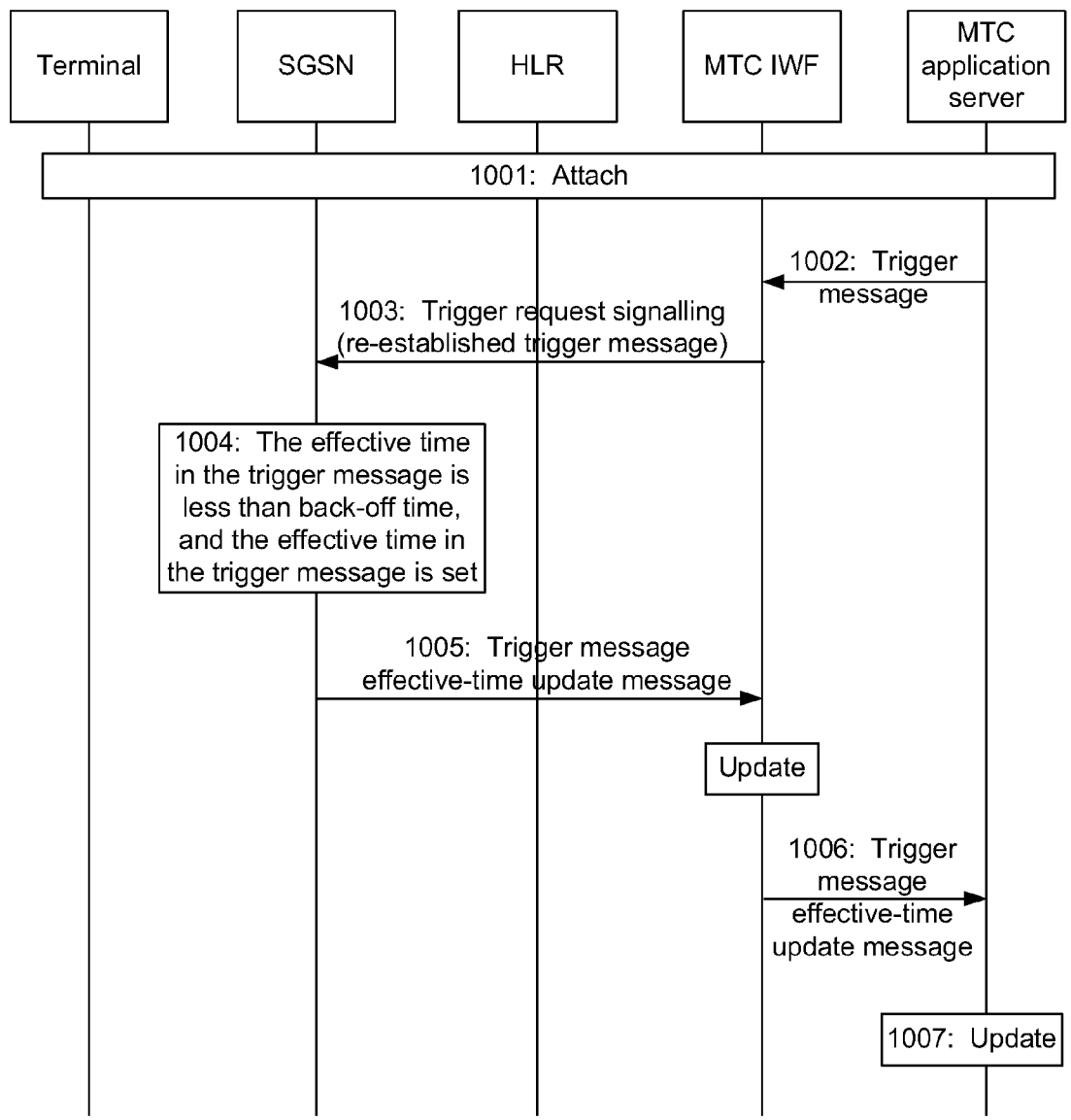
FIG. 10 is a flowchart of a method for controlling effective time of a terminal trigger message according to Embodiment 8 of the present disclosure.

In the embodiment, the MTC IWF may store a terminal trigger message. FIG. 10 is a flowchart of a method for controlling effective time of a terminal trigger message according to Embodiment 8 of the present disclosure. As shown in FIG. 10, the flow includes:

Step 1001: After the terminal is powered on and attaches to the network, when a signalling connection between the terminal and the current service SGSN of the terminal has been released or interrupted, the terminal enters an idle state from a connection state, and the network turns on a mobile reachable timer.

Step 1002: When needing to acquire real-time data from the terminal, the MTC application server sends a trigger message to the MTC IWF. The trigger message includes an identifier of the terminal, an identifier of an application, an address of the server, effective time of a trigger indication and the like (here, the identifier of the terminal is an external identifier used outside the network).

Step 1003: A local database of the MTC IWF stores a one-to-one mapping table between an external identifier and an internal identifier and a more-to-one mapping table between the internal identifier and the SGSN. The MTC IWF stores and resolves the trigger message, reads the terminal identifier included in the trigger message, looks up, from the mapping table between the external identifier and the internal identifier stored in the local database, an internal identifier used in the network and corresponding to the terminal identifier included in the trigger message, and looks up, from the mapping table between the internal identifier and the SGSN stored in the database, the SGSN where the terminal is located according to the internal identifier. After the SGSN where the terminal is located is found out, a new trigger message is established, in which the external identifier of the terminal included in the original trigger message is replaced by the internal identifier of the terminal, and the new trigger message is sent to the SGSN via trigger request signalling.

Step 1004: After receiving the insert subscriber data signalling from the MTC IWF, the SGSN reads the trigger message included in the insert subscriber data signalling, sets a trigger timer T2 locally, and compares the effective time value in the trigger message with the current time value of the back-off timer. If the effective time value is less than the current time value of the back-off timer, then the SGSN sets the value of the timer T2 locally according to the current time value of the back-off timer, starts up the timer, and meanwhile stores the terminal trigger message.

Specifically, the time value of the timer T2 may be set to be slightly longer than the current time value of the back-off timer, for example, 4 minutes longer than the current time value of the back-off timer.

Step 1005: Since the terminal is under congestion control, the SGSN may not send the trigger message immediately, but waits and sends the trigger message until the terminal has established an NAS connection with the SGSN when the back-off timer expires.

The SGSN sends a trigger message effective-time update message to the MTC IWF to inform the MTC IWF to update the effective time of the terminal trigger message, wherein the trigger message effective-time update message includes the time value of the timer T2 set by the SGSN.

Step 1006: After the MTC IWF receives the trigger message effective-time update message from the SGSN, the MTC IWF updates the effective time of the terminal trigger message with the time value of the timer T2 set by the SGSN. Meanwhile, the MTC IWF sends the trigger message effective-time update message to the MTC application server to inform the MTC application server to update the effective time of the terminal trigger message.

Step 1007: After the MTC application server receives the trigger message effective-time update message from the MTC IWF, the MTC application server updates the effective time of the terminal trigger message with the time value of the timer T2 set by the SGSN.

The above are only the preferable embodiments of the present disclosure, and are not intended to limit the scope of protection of the present disclosure.

The invention claimed is:

1. A method for controlling effective time of a terminal trigger message, comprising:
   receiving, by a mobility management unit, a terminal trigger message from a Machine Type Communication (MTC) application server; wherein the terminal trigger message comprises an effective time value of the terminal trigger message;
   in a scenario of congestion control, determining, by the mobility management unit, that a time value of a back-off timer is longer than the effective time value of the terminal trigger message, and reconfiguring the effective time value for the terminal trigger message; wherein when the mobility management unit rejects an Non-Access Stratum (NAS) request message initiated by a terminal which is under the congestion control, the back-off timer is carried in a rejection message such that the terminal cannot initiate any request until the back-off timer expires;
   wherein the reconfiguring, by the mobility management unit, the effective time value for the terminal trigger message comprises: reconfiguring the effective time value for the terminal trigger message such that the reconfigured effective time value of the trigger message is not less than the time value of the back-off timer.

2. The method according to claim 1, further comprising: after the mobility management unit reconfigures the effective time value for the terminal trigger message,
   informing, by the mobility management unit, a relevant network element to update the effective time value of the terminal trigger message.

3. The method according to claim 2, wherein the relevant network element comprises one or more of the followings: a home subscriber information unit and an MTC Inter Working Function entity (MTC IWF).

4. The method according to claim 3, wherein the home subscriber information unit is a Home Subscriber Server (HSS) or a Home Location Register (HLR).

5. The method according to claim 2, wherein the mobility management unit is a Mobility Management Entity (MME) or a Serving General Packet Radio Service Support Node (SGSN).

6. The method according to claim 1, further comprising: after the mobility management unit receives the terminal trigger message from the MTC application server,
   storing, by the mobility management unit, the terminal trigger message.

7. The method according to claim 6, wherein the mobility management unit is a Mobility Management Entity (MME) or a Serving General Packet Radio Service Support Node (SGSN).

8. The method according to claim 1, wherein the mobility management unit is a Mobility Management Entity (MME) or a Serving General Packet Radio Service Support Node (SGSN).

9. A system for controlling effective time of a terminal trigger message, comprising: a receiving unit, a determining unit and a configuring unit; wherein
   the receiving unit is configured to receive a terminal trigger message from a Machine Type Communication (MTC) application server; wherein the terminal trigger message comprises an effective time value of the terminal trigger message;
   the determining unit is configured to, in a scenario of congestion control, determine whether a time value of a back-off timer is longer than the effective time value of the terminal trigger message which is received by the receiving unit; wherein when the mobility management unit rejects an Non-Access Stratum (NAS) request message initiated by a terminal which is under the congestion control, the back-off timer is carried in a rejection message such that the terminal cannot initiate any request until the back-off timer expires; and
   the configuring unit is configured to, when the determining unit determines that the time value of the back-off timer is longer than the effective time value of the terminal trigger message, reconfigure the effective time value for the terminal trigger message;
   the configuring unit is further configured to reconfigure the effective time value for the terminal trigger message such that the reconfigured effective time value of the trigger message is not less than the time value of the back-off timer;

wherein the receiving unit, the determining unit and the configuring unit are each the result of execution on a processor of software stored in a memory.

10. The system according to claim 9, further comprising an informing unit configured to, after the configuring unit reconfigures the effective time value for the terminal trigger message, inform a relevant network to update the effective time value of the terminal trigger message;

wherein the informing unit is the result of execution on a processor of software stored in the memory.

11. The system according to claim 10, wherein the relevant network element comprises one or more of the followings: a home subscriber information unit and an MTC Inter Working Function entity (MTC IWF).

12. The system according to claim 11, wherein the home subscriber information unit is a Home Subscriber Server (HSS) or a Home Location Register (HLR).

13. The system according to claim 10, wherein the mobility management unit is a Mobility Management Entity (MME) or a Serving General Packet Radio Service Support Node (SGSN).

14. The system according to claim 9, the memory further stores the terminal trigger message after the receiving unit receives the terminal trigger message from the MTC application server.

15. The system according to claim 14, wherein the mobility management unit is a Mobility Management Entity (MME) or a Serving General Packet Radio Service Support Node (SGSN).

16. The system according to claim 9, wherein the mobility management unit is a Mobility Management Entity (MME) or a Serving General Packet Radio Service Support Node (SGSN).

* * * * *